B. F. RUSSELL.
CULTIVATOR.
APPLICATION FILED JULY 18, 1908.

918,702.

Patented Apr. 20, 1909.

Witnesses
L. L. Armstrong.
E. L. Chandler

Inventor
B. F. Russell,
By Woodward & Chandler
Attorneys

UNITED STATES PATENT OFFICE.

BENJAMIN F. RUSSELL, OF ESTESMILL, MISSISSIPPI.

CULTIVATOR.

No. 918,702.  Specification of Letters Patent.  Patented April 20, 1909.

Application filed July 18, 1908. Serial No. 444,173.

*To all whom it may concern:*

Be it known that I, BENJAMIN F. RUSSELL, a citizen of the United States, residing at Estesmill, in the county of Leake and State of Mississippi, have invented certain new and useful Improvements in Cultivators, of which the following is a specification.

This invention relates to farming implements, and more particularly to hand cultivators, and has for its object to provide an article of this class especially adapted to use in fine garden work.

Another object is to provide a cultivator blade of a novel and desirable type which may be manufactured at low cost from stock material.

Another object is to provide a novel and effective means for securing the blade to a handle.

Another object is to provide a means for taking up play between the handle and blade incident to wear.

Other objects and advantages will be apparent from the following description and it will be understood that changes in the specific structure shown and described may be made within the scope of the claims and that any suitable materials may be used without departing from the spirit of the invention.

Figure 1:
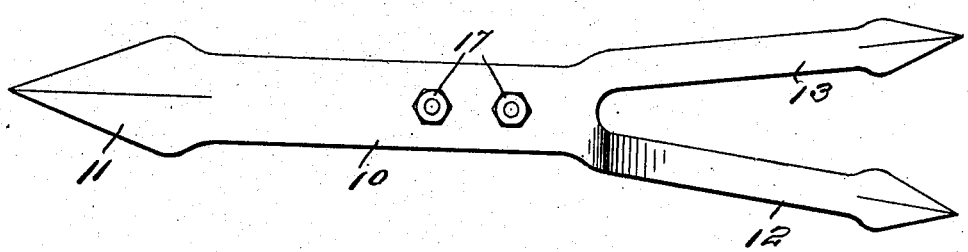
Figure 2:
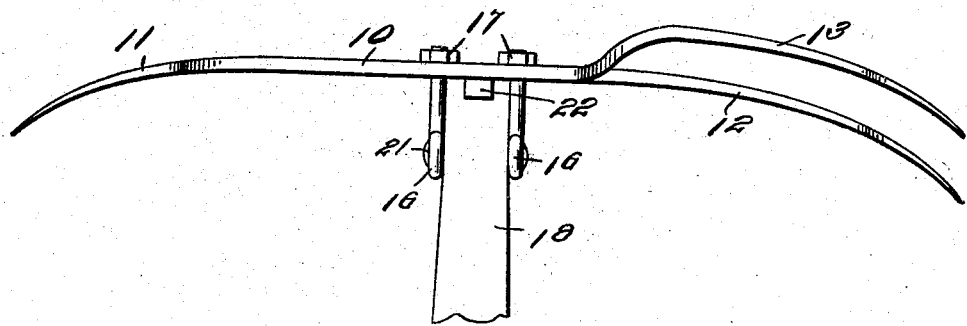
Figure 3:
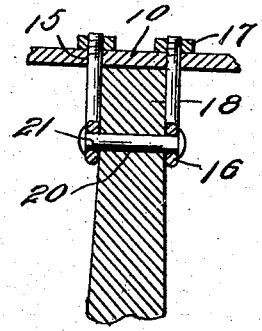

In the drawings forming a portion of this specification, and in which like numerals of reference indicate similar parts in the several views, Figure 1 is a plan view of the blade, Fig. 2 is an edge view of the blade, Fig. 3 is a sectional view showing the means for engaging the blade with a handle.

Referring to the drawings, there is shown a blade portion 10 adapted to be manufactured by being stamped from sheet metal and shaped by rolling. One end of the blade comprises a curved and pointed ground engaging portion 11 similar in shape to the usual "bull tongue" plow; the other end of the blade being bifurcated to form smaller ground engaging portions 12 and 13 similar in shape to the one 11. The portions 12 and 13 are offset edgewise of the blade, and the portion 13 is offset rearwardly of the one 12. This construction is intended to prevent the making of ruts in earth around tender plants. It will be understood that in using the cultivator, after the passing of the portion 12 there is naturally a furrow therebehind, the earth being thrown up on each side of the member in its passage. The portion 13 being disposed rearwardly of the one 12, however, fills the furrow formed by the preceding portion. It will be seen that by the use of the cultivator on tender plants such as grape vines, the earth may be cultivated to any desirable depth and the surface left comparatively even; the necessity for a subsequent operation of smoothing the ground surface being thus obviated.

The means for securing the blade to a handle comprises two longitudinally spaced perforations 15 formed through the blade inwardly of the members 12 and 13 and having threaded bolts engaged therethrough, having eyes 16 formed at one end and having nuts 17 engaged on the opposite ends outwardly of the blade. The eyes 16 are disposed upon the concave side of the blade, in registry, and an end portion 18 of a handle is disposed therebetween in contact with the intervening portion of the blade 10. An opening 20 is formed through the handle portion 18 in registry with the eyes 16, and engaged therethrough there is a pin 21 having its outer end disposed within the eyes 16. Projections 22 are formed upon the blade 10 at opposite sides of the end portion 18 of the handle to prevent lateral movement thereof between the perforations 15. It will be seen that upon tightening the nut 17 the handle portion will be drawn into tight engagement with the blade 10, and that any looseness existing, consequent upon usage, or other cause, may be obviated by further engagement of the nut 17.

What is claimed is:

1. An article of the class described comprising a body portion having a ground engaging head at one end, the opposite end of said member being bifurcated to form similar ground engaging portions, one of said latter portions being offset from the plane of the other, and means for engaging said body portion with a handle.

2. An article of the class described comprising a curvate body portion of sheet metal having an integral large ground engaging portion, two oppositely disposed integral ground engaging portions, one of said second named portions being offset from the plane of the other, said body portion having longitudinally spaced openings therethrough, threaded bolts engaged through said openings, and having eyes formed thereon and disposed in registry a spaced distance from the concave side of said body member, nuts engaged upon said bolts oppositely of said body portion, said body portion having laterally spaced projections formed midway thereof on its concave side, a handle disposed between said bolt and projections, and a pin engaged through said eyes and handle.

In testimony whereof I affix my signature, in presence of two witnesses.

BENJAMIN F. RUSSELL.

Witnesses:
J. C. TRIPLETT,
W. R. GROSS.